M. PREUSS.
COUPLING.
APPLICATION FILED FEB. 28, 1911.
1,046,328.
Patented Dec. 3, 1912.
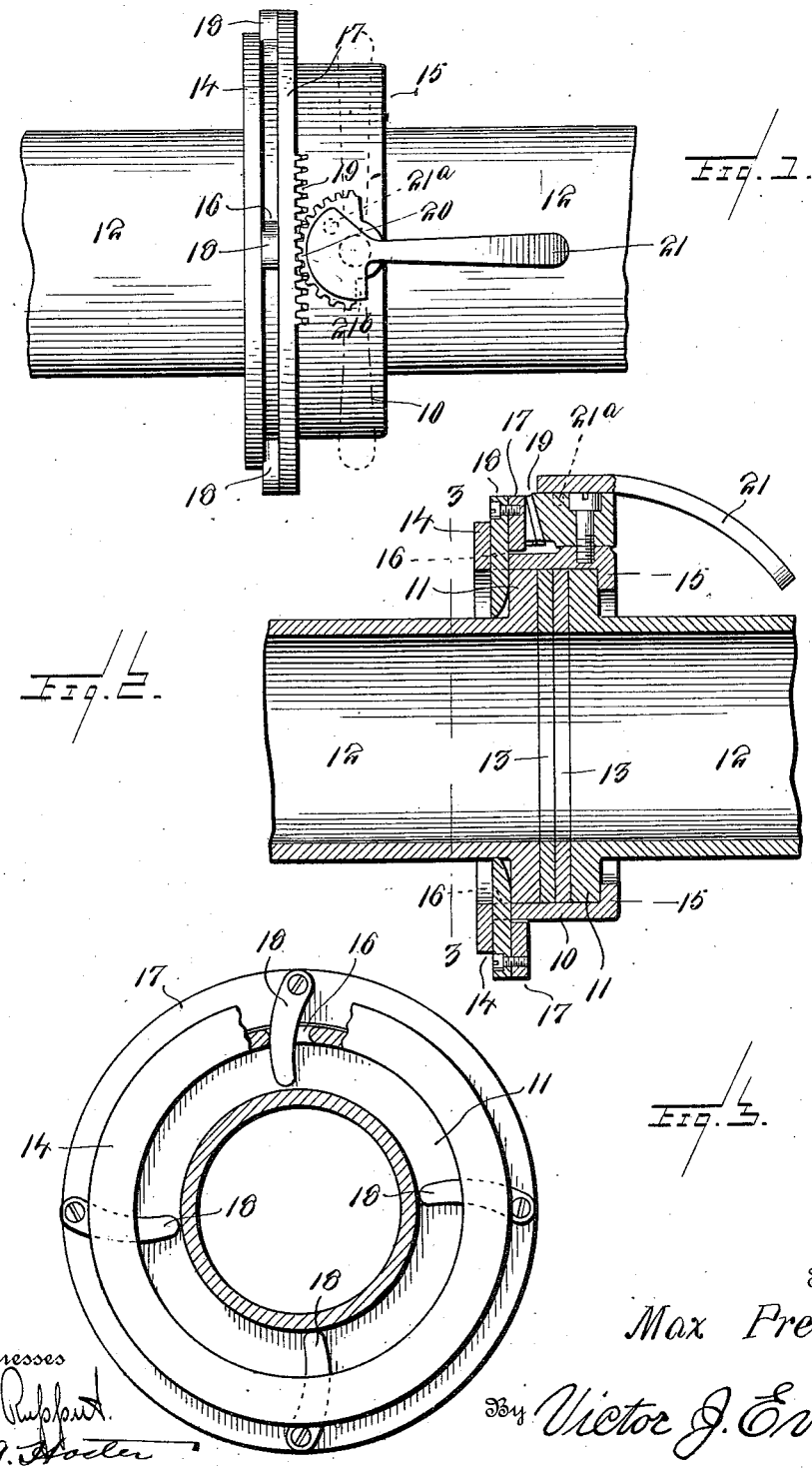
Witnesses
E. P. Rupert
F. A. Hosler
Inventor
Max Preuss
By Victor J. Evans
Attorney

UNITED STATES PATENT OFFICE.

MAX PREUSS, OF NEW YORK, N. Y.

COUPLING.

1,046,328.

Specification of Letters Patent. Patented Dec. 3, 1912.

Application filed February 28, 1911. Serial No. 611,318.

*To all whom it may concern:*

Be it known that I, MAX PREUSS, a subject of the Emperor of Germany, residing at New York, in the county of New York and State of New York, have invented new and useful Improvements in Couplings, of which the following is a specification.

The invention relates to couplings, particularly to pipe couplings, and has for an object to provide a device for easily and efficiently coupling pipe ends or the like. For the purpose mentioned, use is made of an apertured clamping member for peripheral engagement with pipe ends, a ring encircling the said clamping members and provided with a segmental gear, gripping lugs pivotally mounted on the ring and extending through apertures in the clamping member, and a toothed locking member mounted on the clamping member and engaging the rack to operate the ring to move the gripping lugs into gripping engagement with one of the said pipe ends, thus detachably connecting the said ends.

Reference is to be had to the accompanying drawings constituting a part of this specification, in which similar characters of reference denote corresponding parts in all the views and in which, Figure 1 is a top plan view. Fig. 2 is a vertical longitudinal section. Fig. 3 is a transverse section disclosing the gripping lugs of my device, taken in the line 3—3 of Fig. 2.

Referring more particularly to the various views I employ a clamping member 10 for peripheral engagement with flange portions 11 integrally formed on pipe ends 12, each of said flange portions being provided on their outer surfaces with suitable abutting packing rings 13. The clamping member 10 is provided with integral peripheral circular flanges 14 and 15 extending laterally in opposite directions and adjacent the flange 14 a series of apertures 16 are provided in said clamping member. Rotatably mounted on the clamping member 10 is a ring 17 and pivotally mounted on the said ring are a plurality of gripping lugs 18 extending inwardly through the apertures in the clamping member. On the outer surface of the ring 17 is provided an integral segmental gear 19 and pivotally mounted on the clamping member 10 is a toothed segmental locking member 20, the said teeth on the locking member being disposed to engage the said segmental gear. A handle 21 is provided for detachable engagement with the segmental locking member 20 to operate the said locking member to actuate the ring 17 and move the gripping lugs 18 into gripping engagement with one of the pipe ends 12. The handle 21 is provided with an integral pin 21ª extending laterally therefrom and is also provided with an integral laterally extending lug 21ᵇ, the said pin 21ª being adapted to fit into an aperture in the segment 20 and the said lug 21ᵇ being adapted to abut against the segment 20 when the handle is attached thereto so that when the handle 21 is operated the same will actuate the segment 20 with respect to the segmental gear 19.

The gripping lugs 18 have their lower ends adjacent the flange 11 beveled, so that when the lugs 18 are moved to engage the flange 11 the beveled edge will contact with the flange and tend to exert a lateral movement with respect to the pipe 12, thus holding the flanges 11 closely together.

In the operation of my device as described, when the same is applied to the pipe ends after the said pipe ends have been positioned to aline as shown in the drawings, by operating the handle 21 the gripping lugs 18 not only engage one of the flanges 11 to exert a lateral movement, but the ends of the said lugs substantially grip one of the pipes 12, thus preventing any sliding movement of the various coupling members.

It will be readily seen that by providing the packing rings 13 as heretofore mentioned, and connecting the pipe ends as described, any leakage at the point of connection is prevented and it will be further understood, that although for the purpose of describing my invention I have shown a particular form of construction, the scope of the invention is defined in the appended claims.

Having thus fully described the invention, what I claim as new, is:—

1. In a coupling, the combination with an apertured clamping member for peripheral engagement with the flange ends of connectible pipes, of a ring rotatably mounted on the said clamping member, spaced gripping lugs equidistantly mounted to swing on the said ring and extending through the apertures in the said clamping member to engage the flange of one of the said pipes, a segmental gear formed on the said ring and a segmental locking member mounted to turn on the said clamping member and movable to engage the said segmental gear and operate the said ring on the said clamping member.

2. In a coupling, the combination with an apertured clamping member for peripheral engagement with the flange ends of connectible pipes, of an inwardly extending circular flange formed on the said clamping member and adapted to engage the flange of one of the pipes, a ring rotatably mounted on the said clamping member, gripping lugs equidistantly mounted to swing on the said ring and extending through the apertures in the clamping member to engage the flange of the other pipe, a segmental gear formed on the said ring and a segmental locking member mounted to turn on the said clamping member and movable to engage the said segmental gear to operate the said ring on the said clamping member.

3. In a coupling, the combination with an apertured clamping member for peripheral engagement with the flange ends of connectible pipes, of a ring rotatably mounted on the said clamping member, gripping lugs equidistantly mounted to swing on the said ring and extending through the apertures in the said clamping member, portions of the said gripping lugs being beveled and engaging the flange of one of the said pipes, a segmental gear formed on the said ring, a segmental locking member mounted to turn on the said clamping member and movable to engage the said segmental gear and operate the said ring on the said clamping member and a handle for removable engagement with the said segmental locking member for operating the same to engage the said locking member with the said segmental gear.

In testimony whereof I affix my signature in presence of two witnesses.

MAX PREUSS.

Witnesses:
CONRAD KALB,
JOSEPH SOBEL.

Copies of this patent may be obtained for five cents each, by addressing the "Commissioner of Patents, Washington, D. C."